UNITED STATES PATENT OFFICE.

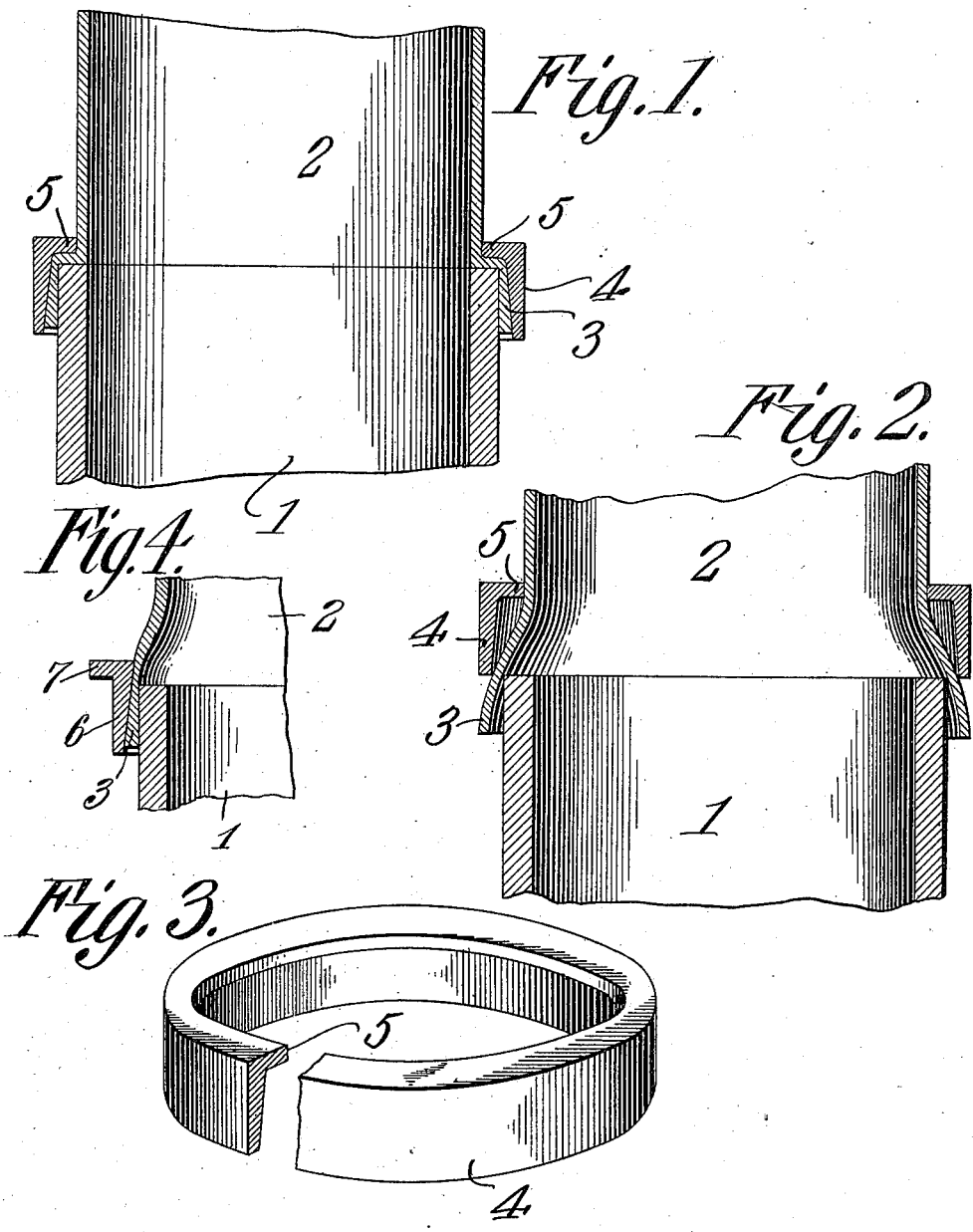

AUGUST T. PFLUGH, OF HOBOKEN, NEW JERSEY.

PIPE-JOINT.

964,052.  Specification of Letters Patent.  Patented July 12, 1910.

Application filed January 22, 1908, Serial No. 412,213. Renewed December 18, 1909. Serial No. 533,925.

*To all whom it may concern:*

Be it known that I, AUGUST T. PFLUGH, a citizen of the United States, residing at Hoboken, in the county of Hudson and State of New Jersey, have invented a new and useful Pipe-Joint, of which the following is a specification.

This invention relates to pipe joints designed to be substituted for brass ferrules and wiped joints such as used in plumbing.

The object of the invention is to provide a simple, durable, and efficient joint which is much cheaper than the ordinary ones used for similar purposes, the same being particularly effective when used in connection with testing ells, traps, and the like and which can also be efficiently used for producing a water tight connection between a pipe and roof. Heretofore in coupling together pipes used in plumbing systems and the like it has been customary to employ brass ferrules and wiped joints all of which adds materially to the cost of the work.

The object of the present invention is to obviate the necessity of employing these devices by providing a joint which insures a tight connection between the parts, even though one of the pipes to be coupled presents perfectly smooth surfaces.

With these and other objects in view the invention consists of certain novel features of construction and combinations of parts which will be hereinafter more fully described and pointed out in the claims.

In the accompanying drawings is shown the preferred form of the invention.

In said drawings: Figure 1 is a section through a coupling embodying the present improvements. Fig. 2 is a similar view showing the relative positions of the parts prior to binding the pipes together. Fig. 3 is an enlarged perspective view of the coupling ring, a portion thereof being broken away. Fig. 4 is a section through a portion of a modified form of the invention.

Referring to the figures by characters of reference, 1 designates a pipe of iron or other non-yielding material and 2 designates a section of lead pipe one end of which is flared or enlarged as shown at 3 so as to be conveniently slipped over one end of the pipe 1. A ring 4 of iron or other non-yielding material is employed for binding the pipe ends together, the inner surface of the ring being tapered and there being an inwardly extending flange 5 integral with the ring and at the small end of the opening extending therethrough.

When it is desired, for example, to fasten together an iron pipe and a lead pipe without wiping the joint or utilizing a ferrule, one end of the lead pipe is flared and placed around one end of the iron pipe 1 after which the ring 4 is slipped along pipe 2 until the tapered inner surface thereof comes into contact with the flared portion of the pipe 2. Ring 4 is then driven longitudinally of the pipes so as to cause said tapered surface to bind upon the flared portion of pipe 2 and clamp it against the pipe 1 and this clamping action will be sufficient to hold the two pipes firmly together without danger of leakage. Flange 5 constitutes a stop for limiting the movement of the ring and preventing it from being driven too far along the pipe 1. However, if desired, this flange may be eliminated. It will be seen that a joint such as herein described is much more simple and inexpensive than the ordinary wiped joints or joints requiring brass ferrules and the like and is equally as efficient as the joints ordinarily employed.

Although in Figs. 1, 2 and 3 the ring 4 has been shown provided with an inwardly extending flange 5 it is to be understood that, if preferred, the ring 6 may be provided with an outstanding flange 7 constituting a head by means of which the ring can be readily driven onto the flared end of the pipe section 2. With this construction the soft metal pipe will not of course be clamped against the end of the pipe 1 as shown in Fig. 1.

What is claimed is:

1. The combination with a soft metal tubular member having a flared end portion; of a tubular member insertible into said flared portion and having a blunt end and a smooth exterior surface, and means movable longitudinally upon the soft metal member for binding the flared portion thereof upon the exterior surface of the inserted member and upon the end of said member.

2. The combination with a soft metal tubular member having an open end portion; of a tubular member insertible into said open end portion and having a smooth exterior surface, an interiorly tapered ring movably mounted upon the soft metal member for engaging the open end portion thereof to bind it upon the inserted member, and an annular flange integral with the ring and constituting a head at the small end of the taper.

3. The combination with a soft metal tubular member having a flared end portion; of a tubular member insertible into said flared portion and having a smooth exterior surface and a blunt end, an interiorly tapered ring mounted upon the soft metal member for engaging the flared portion thereof to bind it upon the inserted member, and an inwardly directed annular flange integral with the ring at the small end of the taper therein.

In testimony that I claim the foregoing as my own, I have hereto affixed my signature in the presence of two witnesses.

AUGUST T. PFLUGH.

Witnesses:
  JOHN ROBERTS,
  ED. McFEELY.